United States Patent
Yadagiri et al.

(10) Patent No.: US 10,395,272 B2
(45) Date of Patent: Aug. 27, 2019

(54) VALUE FUNCTION-BASED ESTIMATION OF MULTI-CHANNEL ATTRIBUTIONS

(71) Applicant: Adobe Inc., San Jose, CA (US)

(72) Inventors: Meghanath Macha Yadagiri, Kodbisanhalli (IN); Shiv Kumar Saini, Kodbisanhalli (IN); Ritwik Sinha, Kodbisanhalli (IN)

(73) Assignee: Adobe Inc., San Jose, CA (US)

(*) Notice: Subject to any disclaimer, the term of this patent is extended or adjusted under 35 U.S.C. 154(b) by 699 days.

(21) Appl. No.: 14/942,109

(22) Filed: Nov. 16, 2015

(65) Prior Publication Data
US 2017/0140418 A1    May 18, 2017

(51) Int. Cl.
*G06Q 30/02*    (2012.01)
*G06Q 30/00*    (2012.01)

(52) U.S. Cl.
CPC ..... *G06Q 30/0244* (2013.01); *G06Q 30/0201* (2013.01); *G06Q 30/0251* (2013.01)

(58) Field of Classification Search
CPC .............. G06Q 30/0244; G06Q 30/0201
See application file for complete search history.

(56) References Cited

U.S. PATENT DOCUMENTS

| | | | | |
|---|---|---|---|---|
| 8,788,339 B2* | 7/2014 | Hughes | ............... | G06Q 30/0255 705/14.46 |
| 9,852,439 B2* | 12/2017 | Bidyuk | ............... | G06Q 30/0242 |
| 2005/0144064 A1* | 6/2005 | Calabria | ................ | G06Q 30/02 705/14.71 |
| 2005/0144065 A1* | 6/2005 | Calabria | ................ | G06Q 30/02 705/14.68 |
| 2007/0043616 A1* | 2/2007 | Kutaragi | ................ | G06Q 30/02 705/14.68 |
| 2007/0079331 A1* | 4/2007 | Datta | ..................... | A63F 13/12 725/42 |

(Continued)

OTHER PUBLICATIONS

Abhishek et al., "Media Exposure through the Funnel: A Model of Multi-Stage Attribution", SSRN, available online at http://ssrn.com/abstract=2158421 or http://dx.doi.org/10.2139/ssrn.2158421, Aug. 17, 2012, 45 pages.

(Continued)

*Primary Examiner* — Luis A Brown
*Assistant Examiner* — Robert C Johnson
(74) *Attorney, Agent, or Firm* — Kilpatrick Townsend & Stockton LLP

(57) ABSTRACT

Techniques for analyzing marketing channels are described. Users are exposed to the marketing channels. User responses (e.g., purchases and no-purchases) to the exposures are tracked. Upon a request from a marketer to analyze an attribution of a marketing channel, the user responses are analyzed. The attribution represents the credit that the marketing channel should get for influencing the users exposed thereto into exhibiting a particular user response (e.g., a purchase). The analysis involves multiple steps. In a first step, a non-parametric estimation is used to generate a value function at a user-level. In a second step, a coalitional game approach is used to estimate the attribution based on the value function. A response is provided to the marketer with data about the attribution.

20 Claims, 8 Drawing Sheets

(56) References Cited

U.S. PATENT DOCUMENTS

| | | | | |
|---|---|---|---|---|
| 2007/0087756 | A1* | 4/2007 | Hoffberg | G06Q 10/0631 455/450 |
| 2011/0071899 | A1* | 3/2011 | Robertson | G06Q 30/02 705/14.43 |
| 2011/0302025 | A1* | 12/2011 | Hsiao | G06Q 30/02 705/14.42 |
| 2011/0313832 | A1* | 12/2011 | Herbrich | G06Q 30/0214 705/14.16 |
| 2013/0279672 | A1* | 10/2013 | Mohan | G06Q 10/0635 379/133 |
| 2014/0316883 | A1* | 10/2014 | Kitts | G06Q 30/0242 705/14.45 |
| 2015/0134807 | A1* | 5/2015 | Narayanam | G06Q 30/02 709/224 |
| 2015/0149274 | A1* | 5/2015 | Conrad | G06Q 30/0244 705/14.44 |
| 2015/0223256 | A1* | 8/2015 | Xu | H04W 72/0493 370/329 |
| 2015/0254709 | A1* | 9/2015 | Carlyle | G06Q 30/0255 705/14.45 |
| 2015/0356570 | A1* | 12/2015 | Goldsmid | G06Q 30/0201 705/7.29 |
| 2016/0034923 | A1* | 2/2016 | Majumdar | G06Q 40/00 705/7.29 |
| 2017/0194814 | A1* | 7/2017 | Chakraborty | G06Q 10/06 |

OTHER PUBLICATIONS

Armstrong et al., "Error measures for generalizing about forecasting methods: Empirical comparisons", International Journal of Forecasting, vol. 8, No. 1, Jun. 1992, pp. 69-80.

Binmore et al., "The Nash Bargaining Solution in Economic Modelling", The RAND Journal of Economics, vol. 17, Issue 2, Summer 1986, pp. 176-188.

Breiman , "Random Forests", Machine learning, vol. 45, Issue 1, 2001, pp. 5-32.

Dalessandro et al., "Causally motivated attribution for online advertising", ADDKDD'12 In Proceedings of the Sixth International Workshop on Data Mining for Online Advertising and Internet Economy, Aug. 12, 2012, 9 pages.

Hastie et al., "The Elements of Statistical Learning, Data Mining, Inference and Prediction", Springer Series in Statistics, Second Edition, Feb. 1999, 764 pages.

Shao et al., "Data-driven Multi-touch Attribution Models", In Proceedings of the 17th ACM SIGKDD International conference on Knowledge discovery and data mining, Aug. 21-24, 2011, pp. 258-264.

Shapley , "Notes on the n-Person Game, II: The Value of an n-Person Game", The rand corporation, U.S. Air Force project rand, Research Memorandum, Technical report, DTIC Document, Aug. 21, 1951, 19 pages.

Sinha et al., "Estimating the incremental effects of interactions for marketing attribution", International Conference on Behavioral, Economic, Socio-Cultural Computing, 2014, 6 pages.

Skidmore , "A comparison of techniques for calculating gradient and aspect from a gridded digital elevation model", International Journal of Geographical Information Systems, vol. 3, No. 4, 1989, pp. 323-334.

Xu et al., "Path to Purchase: A Mutually Exciting Point Process Model for Online Advertising and Conversion", Management Science, vol. 60, Issue 6, Apr. 16, 2014, 35 pages.

* cited by examiner

VALUE FUNCTION-BASED ESTIMATION OF MULTI-CHANNEL ATTRIBUTIONS

TECHNICAL FIELD

This disclosure relates generally to techniques for data mining of user interaction with marketing channels.

BACKGROUND

A user is commonly exposed to multiple marketing channels. The purchase journey takes many roads: e-mail, mobile, display advertising, social media and so on. All these impressions have an influence on the final decision of the user. To maximize conversions (e.g., purchases of the user), a marketer needs to understand how each of these marketing efforts affects the final decision and, accordingly, optimize the advertising budget over the marketing channels. Interpreting the influence of various marketing channels to the user's decision process is called marketing attribution.

The marketer uses different marketing channels across different users. The different marketing channels form different journeys of exposure. For example, while one user is exposed to e-mail and mobile advertisements, another user is also exposed to social media advertisement. The conversion of each user can be more influenced by a particular marketing channel (e.g., e-mail advertisement). However, more often than not, the total journey has a higher influence on the user's conversion. Thus, a proper marketing attribution analysis should consider the different journeys of the users.

Traditionally, marketing attribution uses models that assign the influence to each marketing channel in a rule-based manner, which is often non-intuitive. For example, whereas the user is exposed to a combination of marketing channels, a rule allocates the highest attribution to the last marketing channel that the user is exposed to before a purchase decision. However, this type of attribution allocation can be inaccurate. For example, the rules can fail to properly capture the influence of the other intermediary marketing channels on the user's purchase decision.

Other approaches have also been adopted. These approaches generally use algorithmic models, such as ones that implement regression functions. Typically, the algorithmic models make assumptions around particular parameters to estimate the marketing attributions. The accuracy of the estimation depends on the assumptions.

Commonly, relationships between exposures to "k" marketing channels and user conversion are assumed. For example, an exposure to "k" marketing channel is assumed to result in a conversion (e.g., purchase) at a certain likelihood. A logistic regression function is used to estimate the attribution of each marketing channel. The accuracy of estimation largely depends on how well the assumed relationships map to the actual relationships. Generally, the actual relationships are unknown, potentially non-linear (e.g., a higher number of marketing channels does not translate into a higher conversion likelihood) and may show synergistic effects (exposure to one marketing channel affects the influence of another marketing channel on the conversion). Thus, by relying on assumed relationships, analyzing the marketing attributions can involve some inaccurate estimations.

SUMMARY

One exemplary embodiment involves managing an advertisement campaign of a marketer in real-time. The advertisement campaign uses multiple marketing channels and is facilitated by a computing environment of a service provider. User responses to exposures of the marketing channels are tracked as part of facilitating the advertisement campaign. An analysis tool is configured to analyze the user responses and estimate the attributions of the marketing channels. The analysis tool implements a non-parametric estimation that does not assume relationships between the exposures and user responses. The marketer can interface with the analysis tool over a network to request and receive the attributions in real-time. This allows the marketer to allocate the resources across the marketing channels to improve usage of the advertisement campaign.

These illustrative features are mentioned not to limit or define the disclosure, but to provide examples to aid understanding thereof. These and additional features may be implemented independently in various embodiments or may be combined in yet other embodiments, further details of which can be seen with reference to the following description and illustrations. Advantages offered by one or more of the various embodiments may be further understood by examining the specification or by practicing one or more of the various embodiments.

BRIEF DESCRIPTION OF THE FIGURES

These and other features, embodiments, and advantages of the present disclosure are better understood when the following Detailed Description is read with reference to the accompanying drawings.

DETAILED DESCRIPTION

Figure 1:
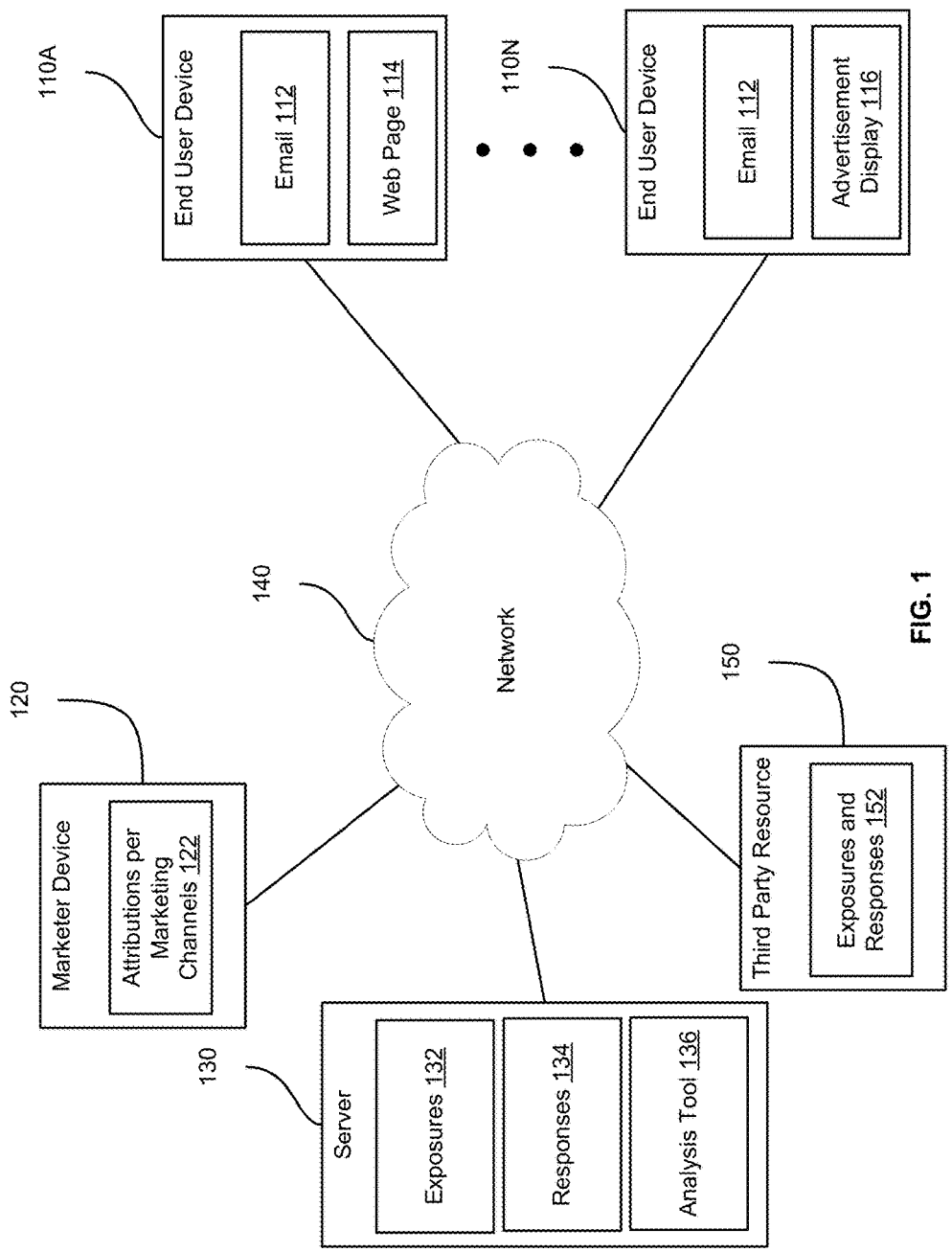
FIG. 1 illustrates an example of a computing environment that includes a plurality of marketing channels, according to certain embodiments of the present invention.

Specific details of various exemplary embodiments of the present invention are set forth in the following description and are illustrated in FIGS. 1-6. The various embodiments described herein can be implemented in hardware, software, or a combination thereof. In the figures, similar symbols may identify similar components, unless context dictates otherwise. Certain well-known technology details, such as methods, apparatus, or systems that would be known by one of ordinary skill, are not set forth in the following description or in the figures to avoid unnecessarily obscuring the various examples. Those of ordinary skill in the relevant art will understand that they can practice other examples of the disclosed subject matter without departing from the scope and spirit of the present invention.

Generally, the embodiments described herein are directed to, among other things, analyzing marketing channels. As used herein, a "marketing channel" represents a computing service or medium for providing different marketing services including, for example, advertisement. An email marketing a product or a service, a banner space on a web page, and an advertisement web page are examples of a marketing channel. Specifically, disclosed are methods, systems, and computer readable media that embody techniques for analyzing the marketing channels to determine their influences on user's responses (e.g., decision to convert (purchase, click through, view a page, etc.) or not convert).

An electronic platform of a service provider offers different marketing channels to a marketer. The marketer selects some or all of the marketing channels for an advertisement campaign and allocates respective resources to the selected marketing channels. While the users are exposed to the marketing channels, the service provider tracks the exposure of each user and the resulting response via the electronic platform. As such, a large amount of user data for thousands, if not millions, of users is collected on a periodic basis (e.g., daily). Upon a request from or via an interface with the marketer, an analysis tool of the service provider is used to estimate the attribution of each marketing channel for a particular response (e.g., a conversion). The analysis is performed in real-time on the most up-to-date user data (e.g., data corresponding to the current week of the advertisement campaign). Thus, the marketing attributions are provided in real-time to the marketer and enable the marketer to properly manage the advertisement campaign in real-time. The analysis tool also compares the attributions of the different marketing channels and, optionally, the allocated resources. Recommendations to improve the advertisement campaigns are derived from the attribution comparison. For example, if a marketing channel has a low attribution, a recommendation identifies this marketing channel as a candidate for removal and proposes reallocation of the respective resources to another marketing channel. In another example, a recommendation presents reasons for why resources of a particular marketing channel resulted in a high marketing attribution and proposes using similar resources for a lower performing marketing channel.

In an embodiment, the analysis tool implements a non-parametric estimation to analyze the user data and estimate the marketing attributions. As illustrated in the next figures, the non-parametric estimation has been observed to increase the accuracy of the analysis. The accuracy is increased because no parametric assumptions are made (e.g., no assumptions are made around a functional form for a relationship between user's responses and exposures to marketing channels). Instead, the entire dataset of user data is analyzed to detect, among other things, inter-channel influences on the user's responses. For example, rather than assuming a functional form for a relationship between exposures and responses, the non-parametric estimation considers all possible combinations of marketing channels and estimates the probability of the responses across all of the possible combinations. The accuracy of the analysis is increased typically when the level of synergy between the marketing channels is high. In addition, the non-parametric approach can be scalable and easily deployable, which allows an analysis of any set of data regardless of the source or sources of the data. That is because, as further described herein below, the non-parametric estimation involves less data processing relative to a parametric estimation.

In an embodiment, the non-parametric estimation involves multiple steps. In a first step, a value function of the marketing channels is estimated for a desired user response (e.g., a purchase). As used herein, a "value function" represents a set of values that form a function and that correspond to different combinations of the marketing channels. A value of a particular combination of marketing channels represents a value that estimates the influence on the desired response from exposing a user to the particular combination. For example, the value includes a likelihood of the user exhibiting the desired response when the user is exposed to the particular combination of marketing channels. As such in this example, the value function represents the likelihoods of the desired response, where each likelihood corresponds to an exposure of the user to one of the combinations of marketing channels.

This first step allows the estimation of a surplus generated from each combination of marketing channels. For example, a surplus of a combination of marketing channels is equal to the likelihood of the desired response if a user is exposed to the combination of marketing channels minus the likelihood of the desired response without exposure to any marketing channel. Because a surplus is for a combination of marketing channels, the surplus may not reflect the attribution of each marketing channel from the combination that resulted in the desired user response. The attribution represents the credit that each marketing channel should be accorded because of the influence of that marketing channel on the desired user response.

Accordingly, the non-parametric estimation involves a second step for estimating the attribution of each marketing channel. In this second step, the attribution of each marketing channel is estimated based on the value function. For example, a surplus attribution of a marketing channel is estimated from the surpluses of the different combinations of marketing channels that include the marketing channel. The estimation implements a coalitional game approach that uses the value function as the characteristic function and the marketing channels as the players of the coalitional game. As used herein, a "coalitional game" represents a game theory approach that involves multiple players of a game and an outcome of the game and that estimates the attribution of each player to the outcome. In particular, in the coalitional game, an attribution of each player is estimated based on the joint influence of the players that resulted in the outcome of the game, as represented in the characteristic function. In an example of the first step of the non-parametric estimation, the likelihood of conversion of a user when exposed to all possible combinations of marketing channels is computed.

The computation is performed in three sub-steps. First, all combinations of marketing channels that have been observed are considered. For each combination, the ratio of the number of occurrences of the combination leading to a desired response (e.g., a conversion such as a purchase) to the total number of occurrences of the combination is computed. The resulting ratio is equated to the likelihood of a user exhibiting the desired response when exposed to that particular combination. Second, to estimate the likelihood of a combination of marketing channels that is not observed, the estimates of all sub-sets of the combination of marketing channels observed are averaged. Third, the likelihood of a user exhibiting the desired response when not exposed to any of the marketing channels is estimated based on the likelihood of the user exhibiting the desired response.

In an example of the second step of the non-parametric estimation, all the users who have exhibited the desired response are considered. For each user, a coalitional game is formed. The players of the game are the marketing channels that the user was exposed to and the characteristic function is the likelihoods of the user when exposed to the various combination of marketing channels. The allocation of surplus to the marketing channels for every such coalitional game is performed by using, for instance, the Shapley Value formulation. The allocations over all converting users for each marketing channel are aggregated. The sum of the surplus allocations over all of the marketing channels is the total surplus produced from the marketing efforts.

Turning to FIG. 1, the figure illustrates an example of a computing environment where users are exposed to a plurality of marketing channels. Generally, a user operates a computing device to access different resources over a network, such as to access web pages, social media platforms, etc. As part of this access, a marketer operates a computing device to provide marketing information to the user (e.g., to the user's computing device) through marketing channels over the network. The marketer uses the marketing channels according to a marketing campaign. For example, an advertisement of the marketing campaign is displayed in a space of an accessed web page, in its own web page, or at a social media platform. Responses of the user to the marketing information are collected at a computing system. The collected responses include whether the user exhibited a particular response or not. The particular response may be one of the goals of marketing campaign. For example, the particular response includes a conversion such as a purchase, click through, or a page view in response to the marketing information. An analyst has access to the computing system and operates an analysis tool to analyze collected responses of users and to compute an attribution of each marketing channel relative to the particular response. An attribution of a marketing channel measures the influence on a user exhibiting the particular response (e.g., a conversion) from exposing a user to the marketing channel. The marketer receives the attributions of the marketing channels through the marketer's computing device. The received attributions allow the marketer to assess the effectiveness of each marketing channel and accordingly manage the marketing campaign and usage of the different marketing channels.

As illustrated in FIG. 1, multiple users operate multiple computing devices shown as end user devices 110A-N. At each user device, a corresponding user is exposed to marketing information. The marketing information is provided to the end user device through a combination of marketing channels. For example, an email 112 and a web page 114 are presented at the end user device 110A, where each can contain the same or different marketing information. In comparison, a same or different email 112 and an advertisement display 116 are presented at the end user device 110N. Other combinations and a larger or lower number of marketing channels are available and used across the different end user devices 110A-N.

A marketer operates a computing device, shown as a marketer device 120, to manage a marketing campaign. This management includes, for example, generating the marketing information and deciding what marketing channels to use to distribute the marketing information to the end user devices 110A-N. A service provider operates a computing system, shown as a server 130, to provide the marketing channels. For example, the service provider provides an electronic platform to the marketer for sending emails, bidding on advertisement space within web pages, generating an advertisement web page, bidding on keyword searches for presenting advertisement, posting advertisement or news on a social media web site, etc. As such, the marketer operates the marketer device 120 to communicate with the server 130 of the service provider over a network 140, provide the marketing information and/or select the marketing channels. In turn, the marketing information is provided from the server 130 and/or the marketer device 120 to the end user devices 110A-N over the network 140. The marketing information is delivered according to the marketing channels, such as via the email 112, the web page 114, and the advertisement display 116, and other marketing channels. The network 140 includes a data communication network that can be in part or in full a public network, such as the Internet, or a private network, such as an Intranet.

Figure 3:
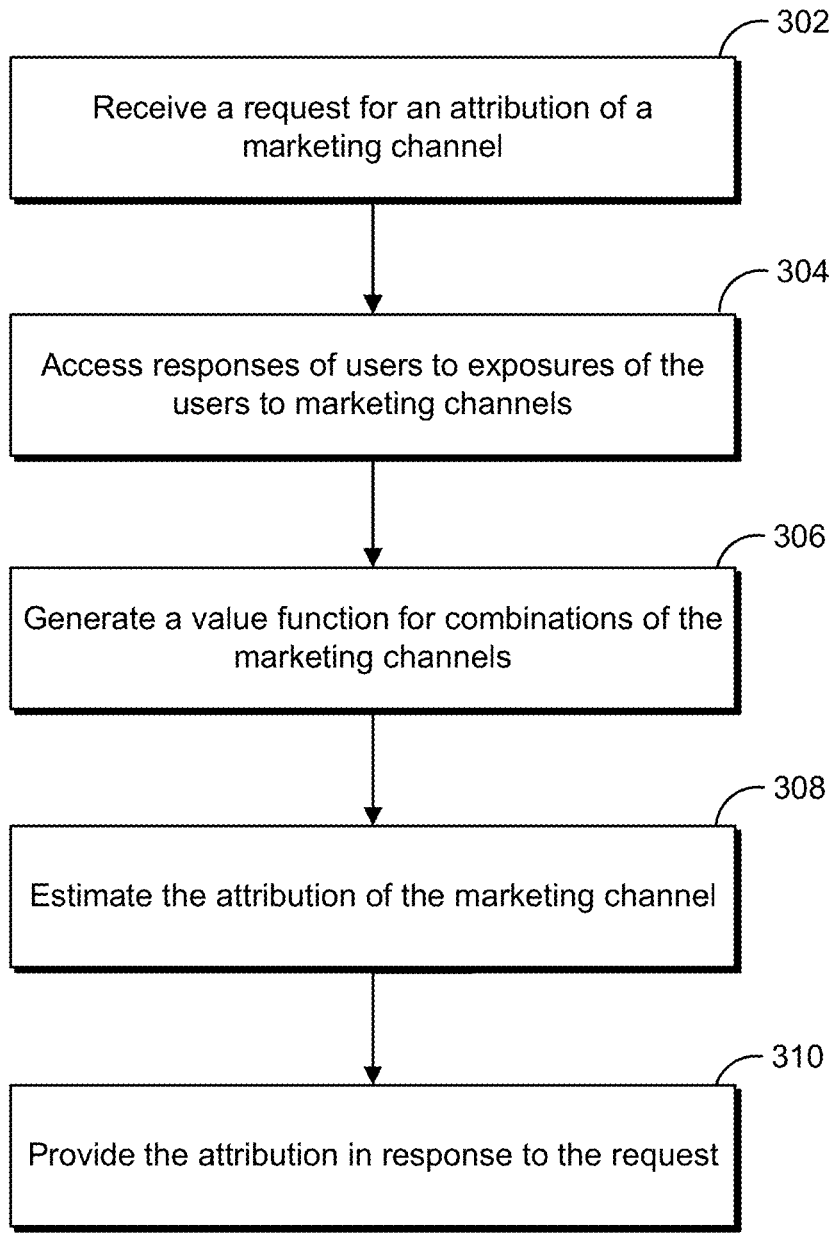
FIG. 3 illustrates an example flow for determining an attribution of a marketing channel based on a multi-step process that involves a non-parametric estimation and a coalitional game approach, according to certain embodiments of the present invention.

In addition, the server 130, or more generally the computing system of the service provider, is configured to track the exposures 132 and responses 134 of the users to the marketing channels. For example, the exposures 132 and the responses 134 are stored in local storage of the server 130 or at a storage remotely accessible to the server 130. The exposures 132 include data identifying what marketing channel(s) (e.g., individual and combination of marketing channels) each user has been exposed to, such as the marketing channel(s) used for providing marketing information to the corresponding end user device. The responses 134 include data identifying the response that each user exhibited as a result of being exposed to a marketing channel(s) (e.g., individual and combination of marketing channels). For example, the responses 134 identify if a user conversion (e.g., a purchase, click through, page view) occurred or not as a result of an exposure. Although FIG. 1 illustrates the exposure 132 and the responses 134 as being tracked in two different data sets, a single data set can nonetheless be used for tracking them together. Further, some or all of the exposures 132 and/or responses 134 can be available from a third party. As illustrated in FIG. 3, a third party operates a third party resource 150 to track and store exposures and responses 152. The third party can provide the service provider the exposures and responses 152 for analysis in lieu of or in addition to the exposures 132 and the responses 134.

To analyze exposures and responses, the service provider implements an analysis tool 136. As illustrated in FIG. 1, the analysis tool 136 is hosted at the server 130. However, the analysis tool 136 can be hosted on another computing resource accessible to the service provider and in communication with the server 130. The analysis tool 136 analyzes the exposures 132, responses 134, and, as applicable, the exposures and responses 152 to estimate the attribution of each marketing channel. The attributions may be estimated for a particular user response. For example, an attribution of a marketing channel is estimated for a user conversion (e.g., a purchase) resulting from exposures to the marketing channel individually and in combination with other marketing channels. Details of how the attributions are estimated are further illustrated in the next figures.

The attributions are provided to the marketer device 120 over the network 140. For example, the attributions are sent to the marketer device 120 upon demand or as a push. The marketer device 120 stores the attributions, shown in FIG. 1 as attributions per marketing channels 122. Various usages of the attributions are available to the marketer, and similarly the service provided. In one example usage, the attributions per marketing channels 122 are presented to the marketer. The presentation allows the marketer to assess the attribution of each marketing channel with respect to a particular user response and to compare the attributions of the different marketing channels to understand what marketing channels have a higher return. For example, if a first marketing channel has a higher attribution than a second marketing channel with respect to user purchases, the marketer can determine that the first marketing channel is more efficient.

In another example usage, the attributions are further analyzed and actions are recommended and/or automatically implemented based on the analysis. For instance, the analysis tool 136 (or an analysis tool at the marketer device 120) analyzes the attributions to rank the marketing channels in terms of efficiencies (e.g., the higher the attribution, the more efficient the marketing channel may be). A recommendation not to use marketing channels falling below a certain rank (e.g., the two lowest marketing channels) can be made. If the recommendation is implemented (automatically or upon an authorization of the marketer), resources allocated to these marketing channels (e.g., associated budgets from the marketing campaign) can be shifted to the remaining marketing channels. Additionally or alternatively, actions performed in support of using each marketing channel are analyzed. For instance, actions associated with a low ranked marketing channel and a high ranked marketing channel are compared to identify reasons for the success of the latter and, accordingly, improve usage of the former. To illustrate, if the analysis indicates that the marketing information used in the high ranked marketing channel (e.g., the format, content, presentation, etc. of an associated advertisement) is a reason, similar or the same marketing information can be used in the low ranked marketing channel to improve its attribution.

Hence, by tracking and analyzing exposures and responses to marketing channels, the attribution of each marketing channel is estimated. As further described in the next figures, an attribution of a marketing channel is estimated based not only on exposures of users to the marketing channel solely, but also on exposures to combinations of marketing channels that include the marketing channel. Thus, the attribution of the marketing channel accounts for the holistic influence of the marketing channel on a user's response (e.g., a conversion such as a purchase decision), whether a user is exposed to that marketing channel alone or in combination with other marketing channels. For example, the attribution of the email marketing channel allows an assessment of how influential that marketing channel is to user purchases even when used with web page, advertisement display, and other marketing channels.

Figure 2:
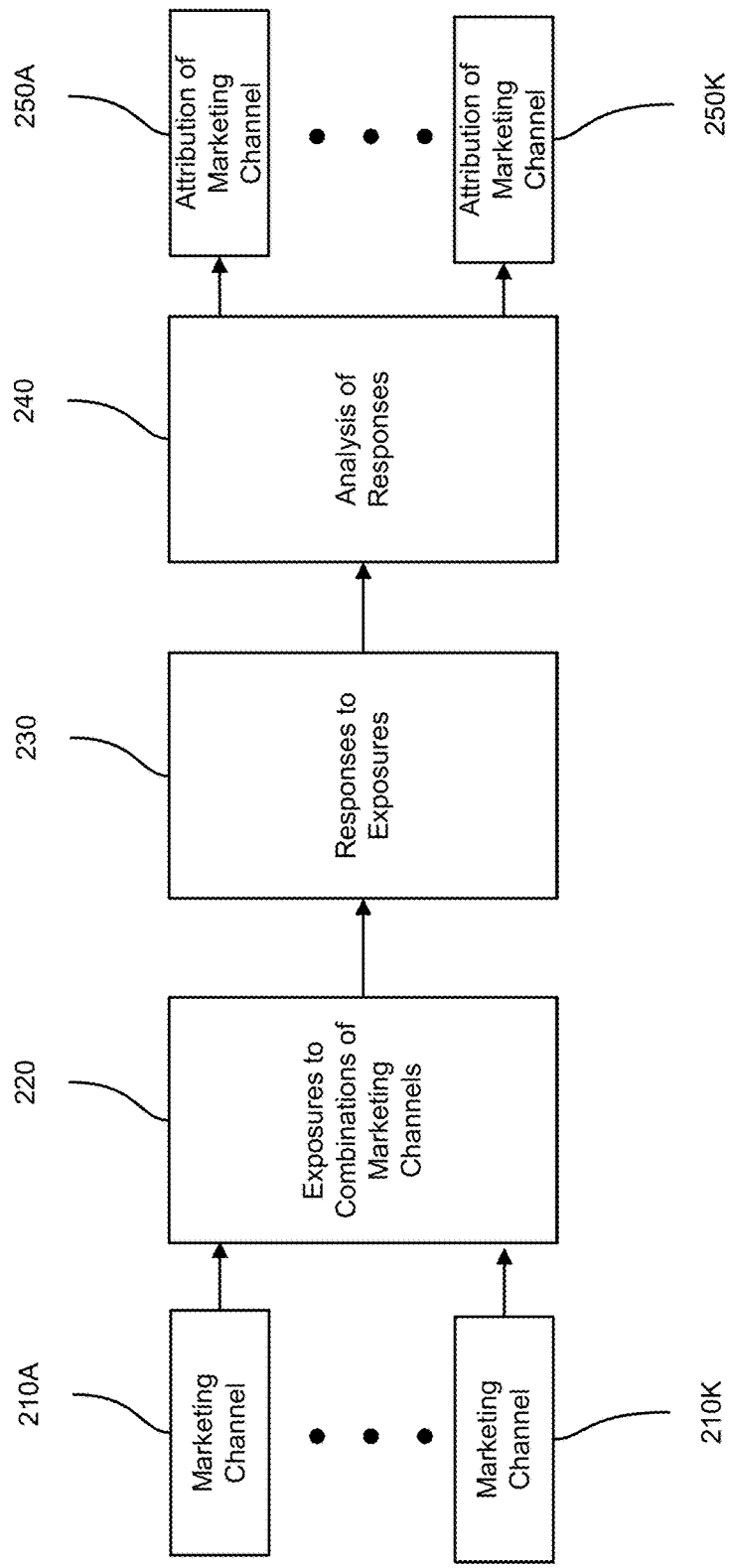
FIG. 2 illustrates an example block diagram for analyzing attributions of marketing channels, according to certain embodiments of the present invention.

Turning to FIG. 2, the figure illustrates an example block diagram for analyzing attribution of marketing channels. Multiple marketing channels 210A-K are used to provide marketing information to end user devices, resulting in exposures 220 of users to the marketing channels 210A-K. Each user can be exposed to a combination of the marketing channels 210A-K. The combinations can be the same or can differ across the users. The exposures 220 result in responses 230 of the users. A response of a user to an exposure to a combination of marketing channels includes a user conversion or lack thereof. The exposures 220 and the responses 230 are tracked per user (or user device) and per combination of marketing channels. An analysis 240 of the responses 230 is implemented to determine the attributions of the marketing channels 250A-K for resulting in a particular user response (e.g., a user conversion or, conversely, a no-conversion). An attribution is determined per marketing channel based on user responses resulting from exposures to various combinations of marketing channels that include the marketing channel.

In an example, the analysis 240 implements a non-parametric estimation that uses multiple steps. In a first example step, a value function is generated for the various marketing channels 210 to estimate, at a user level, the occurrence of the particular user response. In a second example step, an attribution for each marketing channel is estimated from the value function across the users that have exhibited the particular user response. This multi-step analysis is further illustrated in the next figures.

In an example, after an effort to influence conversion of users, a marketer aims to know how various marketing channels faired. This would allow further analysis and an optimization of the spending across the marketing channels. To do so, attributions per marketing channels, such as surpluses, are estimated. In this example, a return is the number of purchases or the amount of revenue generated, click through, page views, etc. due to the efforts of the marketer. The left-over is the return that would have occurred without any exposure to the marketing channels. Accordingly, a surplus is the total return minus the left-over. To facilitate the surplus estimation (e.g., attribution estimation), a service provider (or the marketer) collects data from diverse sources that captures user-level information about all the marketing channels that the user has been exposed to. For attributing the surplus, information regarding the positive gain generated as a result of the marketing interactions is needed. Hence, the transactional information is also collected, such as the number of orders or revenue made by each user. For each user, information about the positive gain (surplus) generated by the user when exposed to one of the many combinations of marketing channels is typically available. To perform the surplus attribution at a user level, the expected positive gain (surplus) from the user is assessed for every possible combination of marketing channels. Hence, a first step to compute the surplus attributions is to estimate the surplus for each user. In this step, a non-parametric estimation approach is used as further described in the next figures. In a second step, the attribution of surplus per marketing channel is computed by using a collaborative game model where a combination of marketing channels (coalitions) are modelled as players of a collaboration to realize collective pay-offs (surplus of the marketer) through mutual co-operation. An example coalitional game is further described in the next figures. For instance, a Shapley Value approach is used for the modelling. The Shapley Value approach is a normative concept in coalitional games that postulates a fair method to evaluate each player's (channel's) individual contribution for this purpose.

Figure 4:
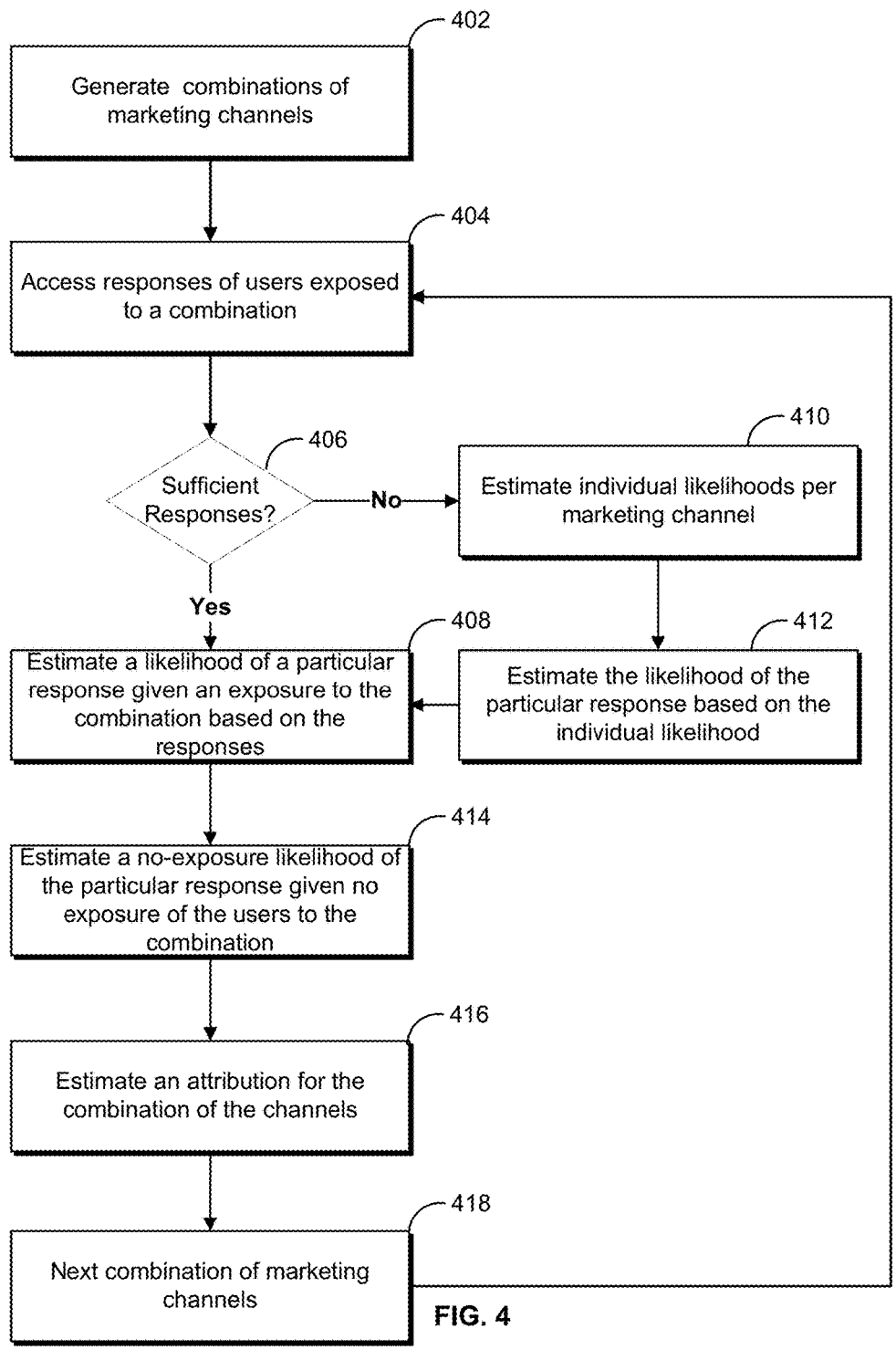
FIG. 4 illustrates an example illustrates an example flow for generating a value function based on a non-parametric estimation, according to certain embodiments of the present invention.
Figure 5:
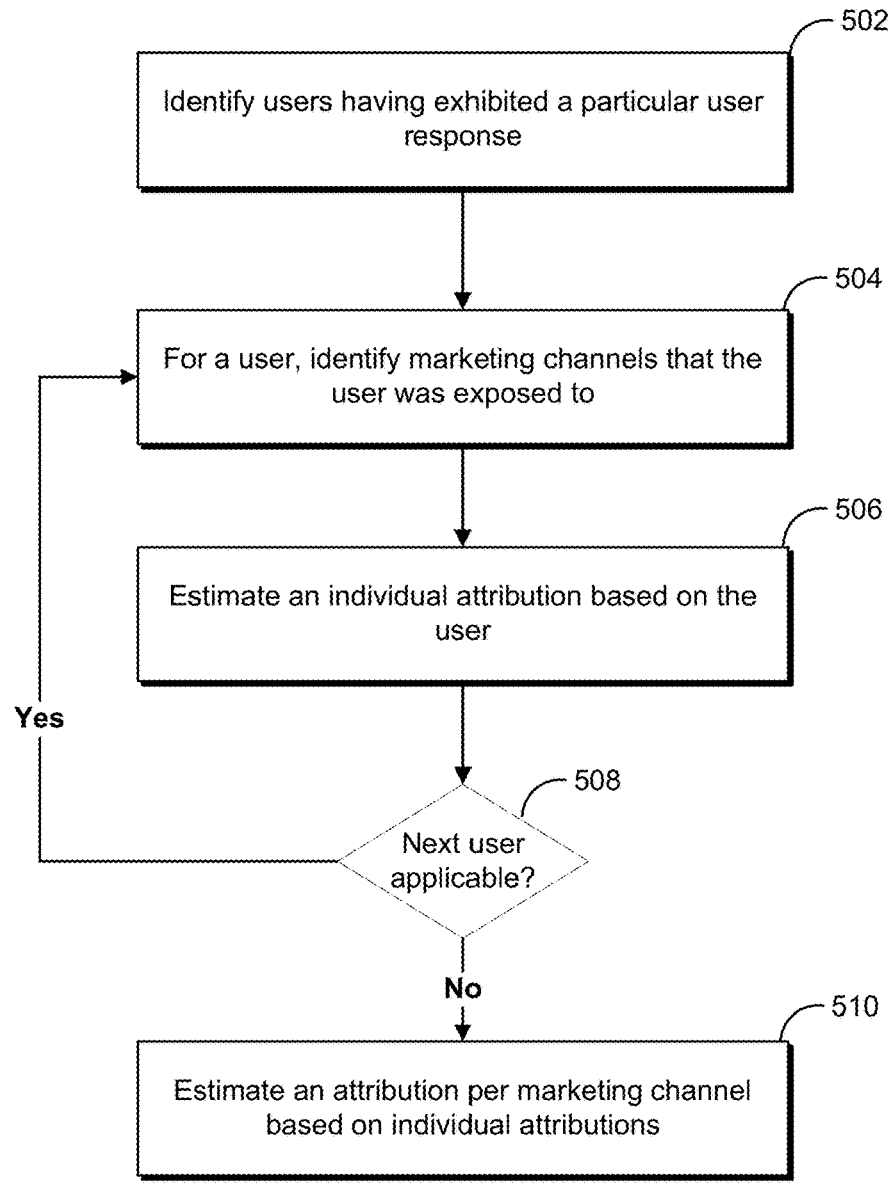
FIG. 5 illustrates an example flow for determining an attribution of a marketing channel based on a coalitional game approach, according to certain embodiments of the present invention.
Figure 7:
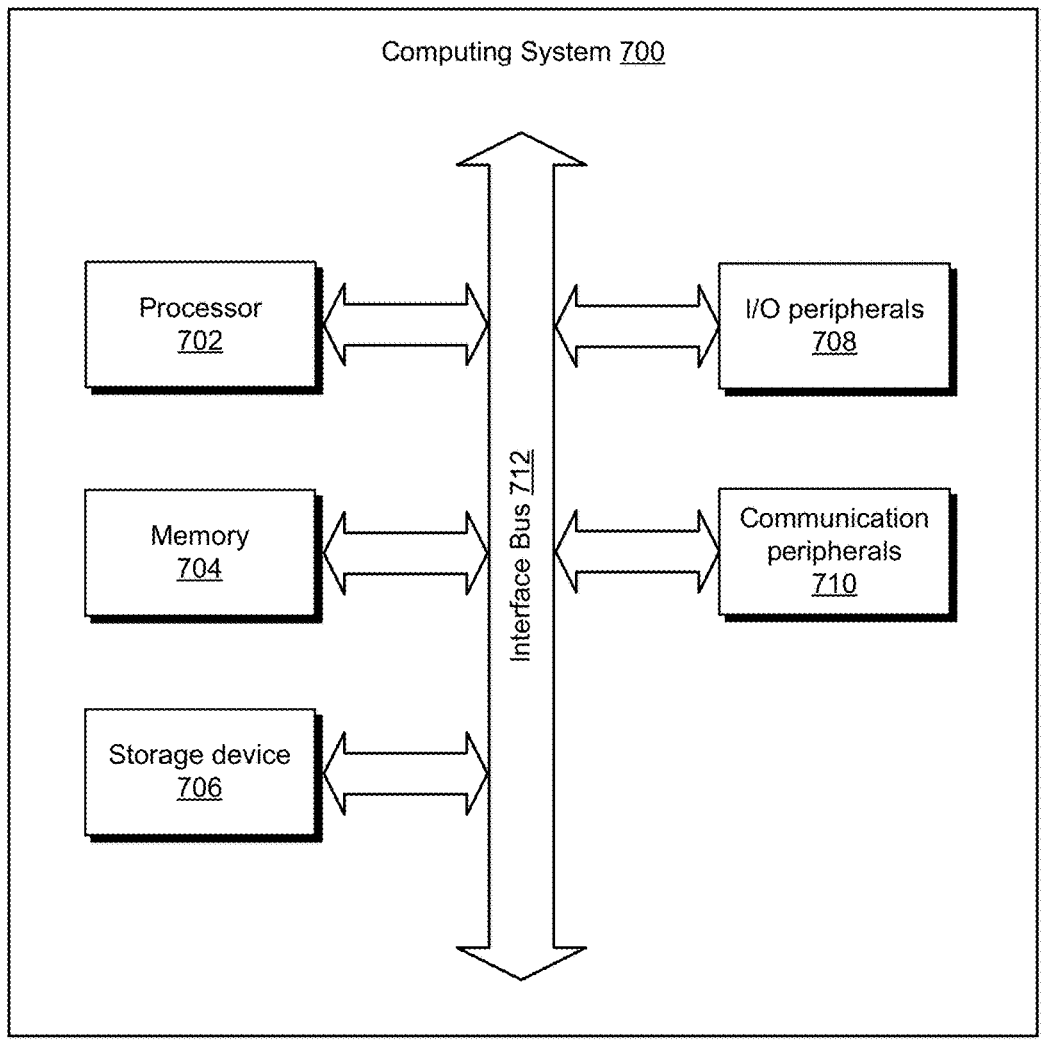
FIG. 7 illustrates an example computing environment suitable for use in implementations of the present disclosure.

FIGS. 3-5 illustrate example flows associated with determining an attribution of a marketing channel. In the illustrative operations, each of the operations or functions can be embodied in, and fully or partially automated by, modules executed by one or more processors of a computing system, such as the server 130 of FIG. 1, or a computing device, such as the marketer device 120 of FIG. 1. Example components of such computing system and computing device are further illustrated in FIG. 7. Additionally, while the operations are illustrated in a particular order, it should be understood that no particular order is necessary and that one or more operations may be omitted, skipped, and/or reordered. In the interest of clarity of explanation, an analysis tool, such as the analysis tool 136 of FIG. 1, is described as performing the illustrative operations. Nevertheless, one of ordinary skill in the art would appreciate that other modules can implement one or more of the operations and/or one or more steps of the operations.

FIG. 3 illustrates an example overall flow for determining the attribution. Operations of the example flow of FIG. 3 can be further embodied in operations of example flows of FIGS. 4 and 5. As such, some operations of the example flows of FIGS. 3-5 are similar. Such similarities are not repeated herein in the interest of clarity of explanation. FIG. 4 illustrates an example flow for generating a value function. In this figure, an example of using a non-parametric estimation is described. In comparison, FIG. 5 illustrates an example flow for generating an attribution based on a value function. In this figure, an example of using a coalitional game approach is described.

Turning to FIG. 3, the example flow starts at operation 302 where a request for an attribution of a marketing channel is received. In an example, a computing system of a service provider receives the request from a marketer device of a marketer. The request can represent an on-demand request to receive the attribution. Additionally or alternatively, the request can represent a subscription request to receive the attribution at various intervals (e.g., at periodic time intervals such as each month or at advertisement campaign intervals such as after each advertisement campaign).

At operation 304, responses of users to exposures of users to marketing channels are accessed. For example, exposures to combinations of marketing channels are tracked per user (or end user device), collected, and stored at a storage local or remotely accessible to the computing system. Responses of the users to the exposures are similarly tracked per user and a combination of marketing channels, collected, and stored at the storage. An analysis tool hosted on the computing system accesses the responses from the storage.

At operation 306, a value function for combinations of the marketing channels is generated. The value function estimates a value associated with a user response resulting from an exposure to a combination of the marketing channels. For example and for a combination of the marketing channel, the value function estimates a likelihood of a user's conversion (e.g., a purchase, click through, page view, etc.) to occur if the user is exposed to that combination of the marketing channels. In an example, the analysis tool generates the value function based on the accessed responses in a multi-step process.

First, the analysis tool generates the various possible combinations of the marketing channels. Second and for each possible combination, the analysis tools analyzes the responses of the users to exposures of that combination to generate the value associated with the user response and corresponding to that combination. For instance, for a combination of marketing channel "A" and marketing channel "B," the analysis tool accesses the responses to determine the number of user conversions from exposures to the combination of marketing channels "A" and "B." The value is generated as a function of this number, such as the ratio of this number over the total number of users that have been exposed to the combination of marketing channels "A" and "B." In this instance, the ratio represents the likelihood of user conversion given an exposure to the combination of marketing channels "A" and "B." The analysis tool sets the value function as, for instance, a series of the different values corresponding to the different combinations of marketing channels. Continuing with the previous example, if "A" and "B" were the only marketing channels, the value function would include three values: a value for marketing channel "A" alone, a value for marketing channel "B" alone, and a value for the marketing channels "A" and "B" in combination.

If, for a particular combination, the amount of collected responses is insufficient (e.g., statically insufficient) to generate the corresponding value, the analysis tool follows a third step. In this step, the analysis tool determines the individual values of the marketing channels that form the particular combination and generate the value of the particular combination as a function (e.g., the average) of these individual values. To illustrate and referring back to the example of the combination of marketing channels "A" and "B," if there were insufficient user responses to exposures to this combination, the analysis tool analyzes the response to exposures to the marketing channel "A" alone and the response to exposures to the marketing channel "B," and averages the resulting values to estimate the value of the combination of marketing channels "A" and "B."

In a fourth step, the analysis tool estimates a second value function based on the already generated value function. The second value function is estimated for no exposures to any of the marketing channels. In other words, this second value function estimates the particular user response (e.g., a user conversion) if no marketing channel was used and reflects the propensity of a user to exhibit the particular user response absent of the marketing channels. Thus, when the two value functions are considered together, the actual or true attributions of the marketing channels can be estimated by accounting for the influence of the marketing channels and of the user propensity on a user to exhibit the particular user response.

The value function represents values associated with the particular user response and corresponding to combinations of marketing channels. To illustrate and referring back to the example of marketing channels "A" and "B," the value function would include three values: a value for marketing channel "A" alone, a value for marketing channel "B" alone, and a value for the marketing channels "A" and "B" in combination as explained herein above. The value for the marketing "A" on its own is not sufficient to fully represent the attribution of that marketing channel because the marketing channel "A" has also influenced the user response when used in the combination with the marketing channel "B." Thus, to estimate the attribution of marketing channel "A," both values of the marketing channel "A" and of the combination with the marketing channel "B" need to be considered.

At operation 308, the attribution of each marketing channel in association with the particular user response is estimated based on the value function. In particular, an attribution of a marketing channel is estimated from values corresponding to the combinations that include the marketing channel. As explained herein above in connection with the example marketing channel "A," two values from the value function are used (one for marketing channel "A" and one for the combination with the marketing channel "B") to allow an accurate estimation of the attribution of the marketing channel "A."

In an example, the analysis tool uses a multi-step process to estimate an attribution of a particular marketing channel. First, the analysis tool accesses the responses of the users and determines the subset of the users that have exhibited the particular user response. Second and for each user in the subset, the analysis tool determines the combination of marketing channels that the user was exposed to. Third, the analysis tool removes the combinations that do not include the particular marketing channel. Fourth and for each remaining combination (e.g., a combination that includes the particular marketing channel and that resulted in the user exhibiting the particular user response), the analysis tool computes an individual attribution as a function of the value from the value function and corresponding to the combination. Fifth, the process of computing individual attributions is repeated across all of the users from the subset and across all the applicable combinations (e.g., the second through the fourth steps are repeated). Sixth, the analysis tool generates the attribution of the particular marketing channel as a function (e.g., a sum) of the respective individual attributions. This multi-step process is similarly used to estimate the attributions of the other marketing channels.

This multi-step process can be implemented as a coalitional game. For instance, a coalitional game can be generated for each user (e.g., starting at the second step). The players of the coalitional game are the communication channels. The characteristic function of the coalitional game is the value function. The output of the coalitional game is the individual attribution (e.g., the fourth step). The sum of the individual attributions from coalitional games formed across of the users of the subset is equal to the attribution of the particular marketing channel.

At operation 310, one or more of the attributions are provided to the marketer device. For example, the requested attribution(s) is sent from the computing device to the marketer device in response to the request received at operation 302.

In addition, the attributions are used for different analysis purposes. In one example purpose, the attributions are presented to a marketer to help the marketer assess the efficiencies of each marketing channel. In another example, the marketing channels are ranked based on the attributions. A recommendation is provided to the marketer and is implemented automatically or upon an authorization of the marketer. For instance, the recommendation includes shifting resources, such as budgets, between marketing channels (e.g., from the ones having low attributions to the ones with higher attributions). Additionally or alternatively, the recommendation includes identifying an action implemented in a marketing channel as an action to follow or avoid in another marketing channel (e.g., to use an advertisement format in a low ranked marketing channel similar to a format used in a high ranked marketing channel).

FIGS. 4 and 5, describe example flows that can be implemented as sub-operations of operations 306 and 308 of FIG. 3. In the interest of clarity of explanation, the following notations are used.

Let $Y = \{U_1, U_2, \ldots, U_n\}$ be n number of users targeted by the marketer using k marketing channels $\Omega = \{C_1, C_2, \ldots, C_k\}$. A return from a user is defined as a measure of response to marketing activity undertaken by the marketer. Example returns include purchase, revenue, click through, page view, etc. A left-over for a user is defined as the return that would have occurred without exposure to any of the k marketing channels. A surplus for a user is defined as the total return minus the left-over. Hence, return=surplus+left-over. Given that the marketer has generated a return R, surplus S, and left-over L, the non-parametric estimation described in FIG. 4 assigns assign $\Psi = (a_1, a_2, \ldots, a_k)$ to the k marketing channels, where $\Sigma a_j = S$ and $\Pi = (l_1, l_2, \ldots, l_k)$, where $\Sigma l_j = L$ to each of the marketing channels that the marketer has used. To generate the value function using the non-parametric estimation at a user level, the various marketing channels are considered through which each user in Y has been targeted.

In addition, let $E_i = \{e_{i1}, e_{i2}, \ldots, e_{ik}\}$ be the binary vector of a user i who has been exposed to the k available marketing channels. $e_{ij} = 1$ if and only if the user i has been exposed to a marketing channel j and is 0 otherwise. Let $\tau = (b_1, b_2, \ldots, b_n)$, where $\Sigma b_i = R$ be the total return generated by the marketer on all the users targeted by the k available marketing channels. For all the customers in Y, $\rho = (s_1, s_2, \ldots, s_n)$ should be computed and is the surplus produced by each user. $\rho$ is computed by computing $s_i^j$, the surplus produced by user i due to marketing channel j in the matrix $S_{att} = [s]_{ij}$. In $S_{attribution}$, the row-sum is the total surplus produced by each user i, $\Sigma_j s_i^j = s_i$, $s_i \in \rho$. The column-sum is the attributed surplus to a marketing channel j, $\Sigma_i s_i^j = a_j$, $a_j \in \Psi$ and $\Sigma_j \Sigma_i s_i^j = S$ where S is the total surplus achieved by all marketing efforts. The user surplus estimations are used to calculate $(l_1, l_2, \ldots, l_k)$, the left-over vector $\Pi$. Given these notations, the following operations in FIGS. 4 and 5 are described.

Turning to FIG. 4, the figure illustrates an example flow for generating a value function based on a non-parametric estimation. The example flow starts at operation 402 where the analysis tool generates combinations of marketing channels. In particular, because the total number of marketing channels is k, a maximum of $2^k$ possible combinations (excluding repetitions) of marketing channels could have been used by the marketer to target the users. Hence, a maximum of $2^k$ of such combinations could be observed in the dataset. In other words, the data (e.g., returns or responses) collected based on the exposures of the users include data associated with potentially the $2^k$ combinations.

For each combination s of the marketing channels, a value function $f(s)$ is defined as:

$$f(s) = \frac{\text{Purchases}(s)}{\text{Purchases}(s) + \text{Non-purchases}(s)} \quad (1)$$

In equation (1), the value function estimates a value (e.g. a likelihood) of a particular user response (e.g., a purchase) for exposure to a combination s of marketing channels. More particularly, $f(s)$ in equation (1) represents the frequentist estimate of the conditional probability of a purchase given exposure to the marketing channels in the combination s. Similar equations can be used for other values (e.g., a mean instead of a likelihood) and/or for other user responses (e.g., a click through).

At operation 404, responses of users (e.g., returns as defined herein above) exposed to a combination s of the $2^k$ combinations are accessed. For example, the analysis tool accesses the responses from the dataset, identifies the subset of the users that have been exposed to the combination s, and identifies the responses corresponding to this subset of users. These responses are then used to estimate $f(s)$.

At operation 406, a determination is made as to whether a sufficient amount of responses exist to estimate $f(s)$ for the combination s. Typically, all the $2^k$ combinations are not observed in the dataset. As such, there may be a combination s not observed or for which the amount of responses is statistically insufficient. If the amount of responses is sufficient, operation 408 may be performed where $f(s)$ is computed from the responses by using equation (1). Otherwise, operation 410 is followed to estimate $f(s)$.

At operation 410, individual values (e.g., likelihoods as used in equation (1)) are estimated for each marketing channel in the combination s. For example, the analysis tool uses equation (1) for each of the marketing channels rather than the combination s to compute the individual values. At operation 412, the individual values are averaged (or another statistical function is used, such as a mode) to estimate the value for the combination s.

In an example of this estimation under operations 410 and 412, let $P_\Omega$ be the power set of k marketing channels in $\Omega$. The value of $f(s)$, $\forall s \in P_\Omega \setminus S_{observed}$ is estimated in the following manner. For each $f(s)$ to be estimated, $s \in P_\Omega \setminus S_{observed}$, all the subsets of the combination of channels s ($P_s$, the power set of combinations) that belong to $S_{observed}$ are considered. Let this set be $T_{observed}$. Hence $T_{obs} = P_s \cap S_{observed}$. The value of $f(s)$ is given by averaging over all the elements in $T_{observed}$:

$$f(s) = \frac{1}{|T_{observed}|} \sum_{j \in T_{observed}} f(j), \forall s \in P_\Omega - S_{observed} \quad (2)$$

The above equation is used to estimate $f(s)$, $\forall s \in P_\Omega \setminus S_{observed}$. The above definition may not always estimate $f(\emptyset)$. One such instance could be if a marketer does not have information about customers who have not been exposed to any channels and have converted. To tackle such instances, we provide a formulation for estimation of $f(\emptyset)$.

Operations 408-412, and correspondingly example equations (1) and (2), allow the analysis tool to estimate $f(s)$ for the combination s in association with a particular user response. However, the particular user response may have been exhibited by some of the users absent any exposure to any marketing channel. That is because such users may have a propensity for exhibiting the particular user response independently of the marketing channels. Hence, to improve the accuracy of the attribution estimation, this user propensity should be accounted for as described under operation 414.

At operation 414, a value (e.g., a likelihood) of the particular user response given no exposure of the user to any marketing channel (or to the combination s of the marketing channel considered under operations 408-412) is estimated. In a way, this operation represents estimating a second value function where the combination s is null (e.g., no exposure). Let $f(\emptyset)$ denote this value function. In an example, the analysis tool estimates $f(\emptyset)$ by taking advantage of properties of $f(s)$.

In particular, both the effect of channels and $\emptyset$ (no-channels) are inherently captured in $f(s)$. $f(s)$ can be split such that $f(s) = f(s+\emptyset)$ to separate out both the effects. This separation results in $f(s) = f(s+\emptyset) = t(s) + f(\emptyset)$, assuming that t is linear. Let $\Omega^*$ be the set of all non-overlapping cover sets of the set comprising elements of s. Given a set of elements $\Theta = \{1, 2, \ldots, n\}$, $\Delta = \{U_1, U_2, \ldots, U_k\}$ is a non-overlapping cover set of $\Theta$ if $U_1 \cup U_2 \cup \ldots \cup U_k = \Theta$ and $U_i \cap U_j = \emptyset$, $\forall i, j$ in $\Delta$. For each such covering set K in $\Omega^*$, $f(s) = f(s+\emptyset) = \sum_{p \in K} t(p) + f(\emptyset)$. If |K| is the cardinality of the set K, then the equation could be re-written as:

$$f(s) = f(s + \emptyset) = \sum_{p \in K} t(p) + f(\emptyset) + |K|f(\emptyset) - |K|f(\emptyset) \quad (3)$$

$$= \sum_{p \in K} f(p) - (|K| - 1)f(\emptyset).$$

Hence, $f(\emptyset) = \frac{1}{|K| - 1}\left[\sum_{p \in K} f(p) - f(s)\right]$.

The estimates of $f(s)$ are averaged for all covering sets $K \in \Omega^*$ to compute the final estimate of $f(\emptyset)$.

As under operation 410-414, the analysis tool estimates $f(s)$ and $f(\emptyset)$ using example equations (2) and (3) given equation (1). Other example techniques for estimating $f(s)$ and $f(\emptyset)$ given equation (1) are possible. These techniques may use a semi-parametric approach such as one that uses a logistic regression or a random forest.

To estimate the value of $f(s)$, $\forall s \in P_\Omega \setminus S_{observed}$ using a semi-parametric approach, probabilistic estimates can be used from a binary classification algorithm. A logistic regression and a random forest can be used for the binary classification algorithm. In an example, the binary classification algorithm is trained in the following manner. First, predictive variables are computed. For each user, the feature vector is equal to $E_i$. Second, a response variable is computed. For each user i, the response variable is assigned a value of "1" if the user i produced return to the marketer and a value of "0" otherwise. The probability estimates from the binary classification algorithm are interpreted as the likelihood of a user to provide some return to the marketer given the user has been exposed to a particular set of marketing channels. $f(s)$ computed in equation (2) can be replaced by the probability estimates from the binary classification algorithm.

In addition, the probability estimate of a user to produce return given that the user has been exposed to no marketing channels is equated to be $f(\emptyset)$. In a logistic regression, this leads to the effect of the intercept term towards the conditional probability.

At operation 414, upon computation of $f(s)$ and $f(\emptyset)$, an attribution of the combination s of marketing channels is estimated. This attribution is for the combination s rather than the individual marketing channels thereof. By considering $f(\emptyset)$, the true attribution of the combination s is determined because the user propensity to exhibit the particular user response is accounted for. Let g(s) denote this attribution. In an example, the analysis tool estimate g(s) as $g(s) = f(s) - f(\emptyset)$.

At operation 418, the next combinations of marketing channels is considered. In an example, the analysis tool considers the next combination s from the $2^k$ combinations and repeats operations 404-416 to estimate $f(s)$, $f(\emptyset)$, and g(s) for the next combination. Operation 418 allows estimating $f(s)$, $f(\emptyset)$, and g(s) for the different $2^k$ combinations.

Once the attribution g(s) is computed, a surplus for each of the $2^k$ combinations can be estimated. For example, the analysis tool computes the surplus as g(s) times the value per unit of return.

Hence, the example flow of FIG. 4 allows an estimation of attributions (e.g., g(s)) for all $2^k$ combinations of marketing channels based on a value function (e.g., $f(s)$). Referring back to the example of the two marketing channels "A" and "B," $f(s)$ and g(s) are estimated for s=$\emptyset$, A, B, A and B. The attribution g(A) does not on its own accurately reflect the true attribution of the marketing channel "A" because it does not account for the attribution of the marketing channel "A" when used in combination of the marketing channel "B." Thus, a more accurate attribution of the marketing channel "A" is one that is based on g(A) and g(A and B). FIG. 5 illustrates an example of making this more accurate attribution computation.

The example flow of FIG. 5 starts at operation 502, where users having exhibited a particular user response (e.g., a purchase) are identified. In an example, the analysis tool accesses the responses from the dataset and identifies the users having the particular user response. Let this set of users be $\Lambda$, where $\Lambda \subseteq Y$ (the set of n users).

At operation 504, for a user of the identified users, the marketing channels that the user was exposed to are identified. The exposures include exposures to combinations of such marketing channels. In an example, analysis tool identifies these marketing channels from the dataset. Let this set of channels be $E \subseteq \Omega$ (the set of all k marketing channels).

At operation 506, an individual attribution for each of these marketing channels is estimated for the user. Various techniques may be implemented for this estimation. In one example technique, a coalitional game is used as further described herein next. Other techniques may also be similarly used, such as an incremental attribution approach or a game-theoretic approach.

A coalitional game denoted by (f, N) is defined by a characteristic function f and total number of players in the game N, where f maps subsets of players to real numbers: $f: P(N) \to R$ with $f(\emptyset)=0$, where $\emptyset$ denotes the empty set and P(N) is the power set of the N players. In this case, the analysis tool forms the coalitional game (g, E), where $g(s)=f(s)-f(\emptyset)$, and where $f(s) \forall s \in$ power set of E and is estimated as described in FIG. 4.

In an example, a Shapley Value approach is used in the coalitional game. Shapley Value is an approach in co-operative game theory to distribute the total returns to the players in a coalition. According to the Shapley value, the amount that player i gets given a coalitional game (f, N) is given by:

$$\phi_i(f) = \Sigma_{T \subseteq N \setminus \{i\}} |T|! \frac{(|N|-|T|-1)!(f(T \cup \{i\})-g(T))}{|E|!},$$

where N is the set consisting of all players and the sum extends over all subsets T of N not containing player i. Using a football game analogy, the Shapley Value formula can be interpreted by imagining the coalition (f, N) being formed of one football player at a time, with each football player demanding the football player's contribution $(f(T \cup \{i\})-f(T))$ to a game as a fair compensation (e.g., although a defensive end may not have contributed directly to a touchdown, that football player may have nonetheless contributed to a win of the game by keeping the opposing team from scoring), and then for each football player, averaging this contribution over the possible different permutations in which the coalition can be formed.

Using the Shapley Value approach, the total gain g(E) is interpreted to be the fractional contribution the marketing channels, in a combination s, have made to the surplus generated by the marketer that is distributed to all the marketing channels involved. The channel-level attributions (pay-off) for each marketing channel in E for the user in $\Lambda$ is given according to the Shapley Value approach by:

$$s_i^j(g) = \sum_{T \subseteq E \setminus \{j\}} \frac{|T|!(|E|-|S|-1)!}{|E|!} (g(T \cup \{i\})-g(T)) \quad (4)$$

The $s_i^j$ calculated here is plugged into the matrix $S_{attribution}$. For the users who belong $\Upsilon \setminus \Lambda$, $s_i^j$ is zero because there was no return from these users due to exposure of the various marketing channels. The individual attribution of the user i (as selected at operation 504) for a marketing channel j is $s_i^j$.

At operation 508, a determination is made as to whether the individual attributions have been computed for all users i in the subset $\Lambda$. If not, the next user is selected and the operations 504-508 are repeated. Otherwise, operation 510 is followed.

At operation 510, the attribution of each marketing channel j is estimated based on the individual attributions $s_i^j$. In an example, the analysis tool calculates the attribution of each marketing channel j for all k marketing channels by cumulating the individual attributions $s_i^j$ obtained from equation (4). If n is the total number of users under consideration, the aggregated channel attributions for each channel in $\Omega$ is given by:

$$\sum_i s_i^j = a_j, \, j = 1, 2, \ldots, k \quad (5)$$

In another example of using the Shapley Value approach, instead of forming coalitional games (g, E) at a user-level, the users who have been exposed to a particular combination of the marketing channels can be grouped. Once the grouping is done, coalitional games can be formed for each combination rather than at the user-level. Such a combination-level formulation can reduce the number of games formed and, hence, is computationally more efficient.

The above computer attributions represent the surplus attributions of the marketing channels. In addition to attributing such surpluses, left-overs can also be attributed to the marketing channels. The left-over of a marketing channel is the return minus the surplus of that marketing channel. In an example, the total left-over to be attributed to the k channels is obtained by using $a_j$ computed through equation (5). The left-over is computed by $L=\Sigma_i b_i - \Sigma_j a_j = R-S$. Marketing channel-wise left-over attributions are assigned using $a_j$ by $$l_j = \frac{a_j}{\Sigma_j a_j} * L.$$

This formulation is inspired by the concept of Nash bargaining solution. Nash bargaining is a bargaining problem modeled with an outside option. If the bargaining collapses (if there is no co-operation among the players), each player gets the outside option. For estimating the left-overs, the players are the k marketing channels and the outside option is the surplus attributed to each marketing channel. Because the interest is in assigning the left-over return to the k marketing channels, it is assumed that the left-over return was generated due to no co-operation among the marketing channels. Once $\Psi=(a_1, a_2, \ldots, a_k)$ and $\Pi=(l_1, l_2, \ldots, l_k)$ are computed, the final attributions are given by $(a_1+l_1, a_2+l_2, \ldots, a_k+l_k)$.

Figure 6A:
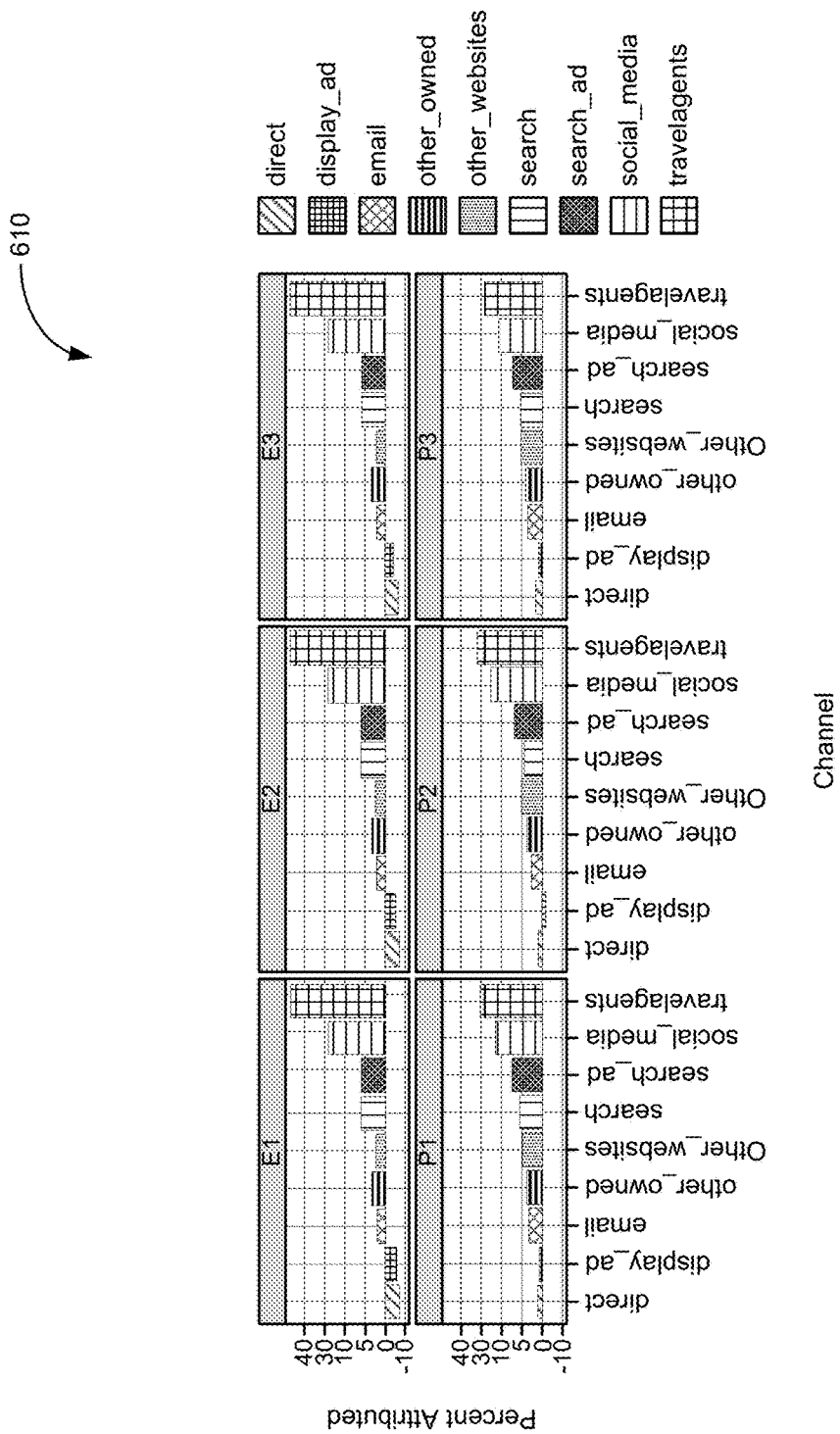
FIGS. 6A and 6B illustrate example empirical results of attribution estimation, according to certain embodiments of the present invention.
Figure 6B:
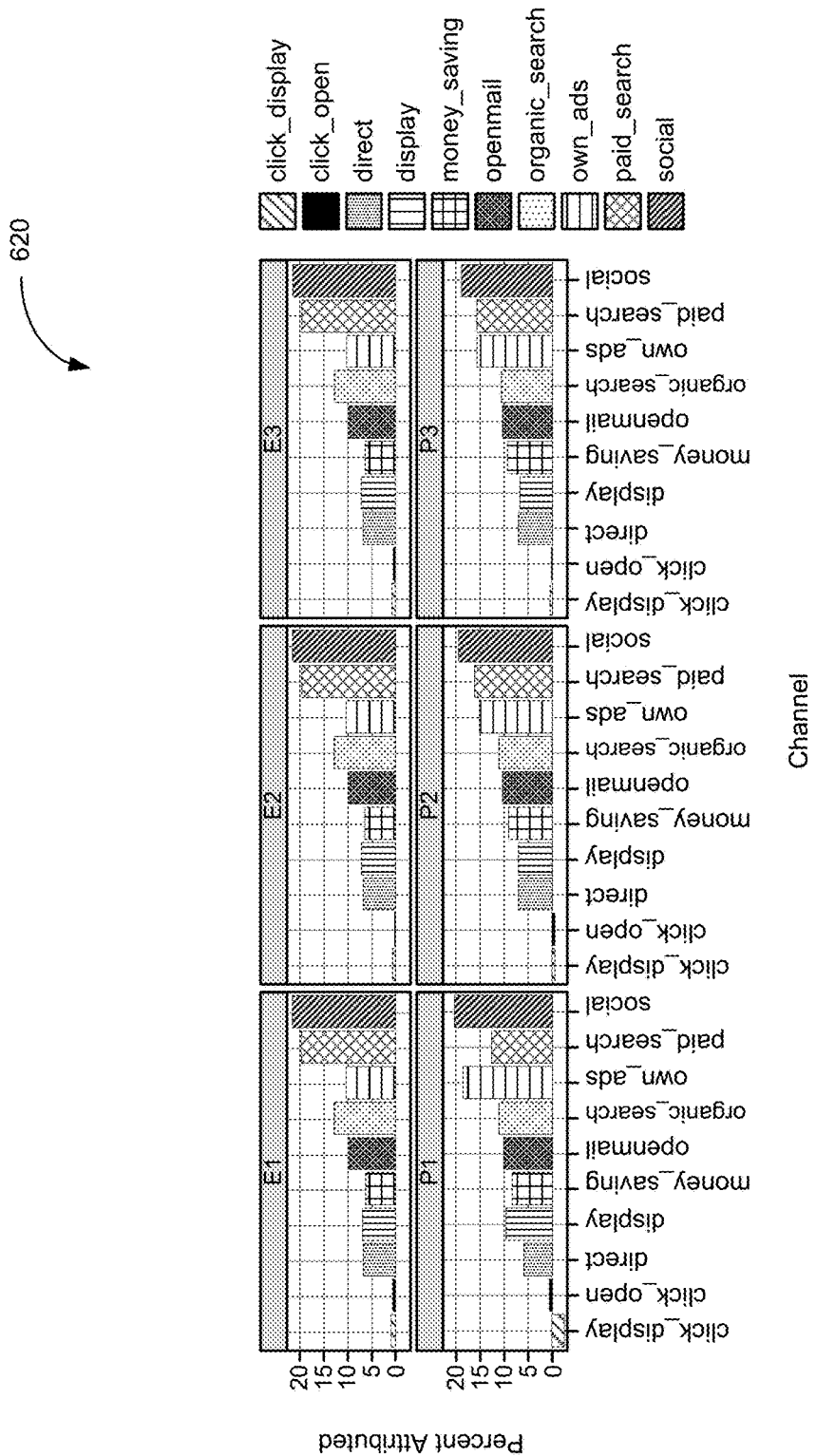

Turning to FIGS. 6A and 6B, the figures illustrate example empirical result 610 (shown in FIG. 6A) and empirical result 620 (shown in FIG. 6B) from implementing the example flows of FIGS. 4 and 5. The empirical result 610 corresponds to a "travel and experience organization dataset." In comparison, the empirical result 620 corresponds to an "e-commerce retailer dataset."

The travel and experience organization dataset includes data for two months. The whole data amounts to about two billion page views from twenty six million unique visitors. For a quicker examination, stratified sampling is applied to the data. About 1.5 million unique users who have visited the web property during the last two weeks of the data window are sampled. Of these visitors, about 300,000 of them have made a purchase in the assumed time-frame. The users could be targeted through one of nine marketing channels described in the table below. For each user in the data, information about the various marketing channels the user has been exposed to and the purchase is available, and information about revenue generated by the user as a result of these marketing channels is also available. In this dataset, the order and revenue attributions of the channels are computed as shown in the empirical result 610.

The e-commerce retailer dataset belonged to a large e-commerce retailer. The data ranged over a hundred day period. The data contained about fifty four million responses with eighteen million customers. Stratified sampling is also applied to this data. The sampled data comprised about 400,000 unique users of which about 200,000 have made a purchase. The users were targeted by the marketer through a variety of marketing channels. In this dataset, for each user, information about the marketing channels the user has been exposed to and if a purchase has been made by the user is available, and information about the platform where the purchase has been made ("Instore(I)," "Online(E)") and the type of product that has been purchased is also available. Leveraging this information, channel attributions specific to product category and purchase medium are computed as shown in the empirical result 620.

To better understand the results, exploratory data analysis was conducted in both datasets. The analysis was performed on all the users (purchasers and non-purchasers) and specifically on the converting (purchasing) users since these are the users who have produced return for the marketer. The below table provides a definition of each marketing channel and has details about the number of times each of the marketing channels was exposed to users in the travel and experience organization dataset. From the table, it is observed that direct and search are the marketing channels that all the users and specifically purchasers are most exposed to. In comparison, display advertisement, travel agents and social media are the least occurring marketing channels. An accurate attribution model should gauge the incremental and interactive effect of each marketing channel without biasing for the frequency of occurrence of the channels. Also, from the exploratory analysis, it is observed that more than eighty percent of the non-purchasers and more than fifty percent of the purchasers have only one marketing interaction. Traditional attribution techniques would attribute all the generated return from the purchasers to these marketing channels without considering the users that have not made a purchase. An ideal attribution model should find the true attribution of each marketing channel by contrasting the purchases with non-purchases.

The below table lists the marketing channels along with the frequency of their occurrences in purchases as well as the whole data.

| Marketing Channel | Description | Total (%) | Orders (%) |
| --- | --- | --- | --- |
| direct | a user directly navigating to a web site | 33.8 | 27.5 |
| Display advertisement | a user clicking on a display advertisement | 0.5 | 0.3 |
| Email | a click on an email from a marketer | 1.4 | 1.7 |
| Other-owned | a click from other-owned web properties | 12.5 | 24 |
| Other web site | clicks from other web sites not owned by the marketer | 10 | 8.8 |
| Social media | a user navigates from a social media web site | 4.3 | 2 |
| Search | clicks on organic search | 31.5 | 28 |
| Search advertisement | clicks on search advertisements | 5 | 5.2 |
| Travel agents | a visit from a travel agent web site | 1 | 2.5 |

The surplus was then estimated, using the example flow of FIG. 4. The assumption made in these flows of linearity of t and the approximation of the value of $f(s)$ was validated by noting that the parametric estimate of $f(s)$ using a logistic regression and Random forest was fairly consistent with the estimated $f(s)$ using the equations. For the second dataset, along with the channel-level attributions for the whole dataset, channel attributions specific to each product category and purchase media were calculated and for this purpose, different models were trained for each of the product categories and purchase medium. After the estimation step, channel attributions were estimated using the example flow of FIG. 5. Then the left-over attributions presented were not included in the empirical results to allow a comparison of the attribution results. In the first dataset, both order and revenue channel were calculated.

As shown in FIGS. 6A and 6B, the credit assignment to the "travel agents" marketing channel and the "other-owned" marketing channel in the order attributions of the first dataset are noticeable. These marketing channels receive a higher credit than a few other marketing channels that occurred more frequently in the dataset, satisfying a notion of fairness. In the second dataset, the extensibility of the example flows is shown. In particular, the channel-attributions at a more granular level was computed, specific to the product-category. The marketing channels "direct" and "display advertisement" have a higher order attribution specific to a first product (shown as "P1"), while they have a lower order attribution in case of the "social media" marketing channel. Such insights specific to products give the marketer an added advantage while planning an advertisement campaign's overall spend across different marketing channels.

In summary and as shown by the empirical results 610 and 620, the non-parametric estimation coupled with the coalitional game approach can produce accurate attributions when there is a high level of synergy between the marketing channels. Because a non-parametric approach is used, the attribution estimation needs only a single pass through the whole data. This makes the attribution estimation computationally lighter than parametric models that need multiple passes through the data to compute the channel level attributions. Thus, the attribution estimation is more easily deployable compared to other attribution models and can be deployed on top of any querying engine with ease. In addition, the non-parametric estimation does not depend on using a coalitional game and, thus, is modular and can be independently used to plug into any other attribution model (e.g., one that may not use a Shapley Value approach). For example: one can use the non-parametric estimation to estimate the surplus at the user-level and use a different approach to calculate the channel-level attributions Turning to FIG. 7, the figure illustrates example components for implementing some or all of the components of the server 130 and/or the marketer device 120 of FIG. 1. Although the components are illustrated as belonging to a same computing system 700, this system can be distributed.

The computing system 700 includes at least a processor 702, a memory 704, a storage device 706, input/output peripherals 708, communication peripherals 710, and an interface bus 712. The interface bus 712 is configured to communicate, transmit, and transfer data, controls, and commands among the various components of the computing system 700. The memory 704 and the storage device 706 include computer readable storage media, such as RAM, ROM, electrically erasable programmable read-only memory (EEPROM), hard-drives, CD-ROMs, optical storage devices, magnetic storage devices, electronic non-volatile computer storage, for example Flash® memory, and other tangible storage media. Any of such computer readable storage media can be configured to store instructions or program codes embodying aspects of the disclosure. The memory 704 and the storage device 706 also include computer readable signal media. A computer readable signal medium includes a propagated data signal with computer readable program code embodied therein. Such a propagated signal takes any of a variety of forms including, but not limited to, electromagnetic, optical, or any combination thereof. A computer readable signal medium includes any computer readable medium that is not a computer readable storage medium and that can communicate, propagate, or transport a program for use in connection with the computing system 700.

Further, the memory 704 includes an operating system, programs, and applications. The processor 702 is configured to execute the stored instructions and includes, for example, a logical processing unit, a microprocessor, a digital signal processor, and other processors. The memory 704 and/or the processor 702 can be virtualized and can be hosted within another computing system of, for example, a cloud network or a datacenter. The input and output peripherals 708 includes user interfaces such as a keyboard, screen, microphone, speaker, other input/output devices, and computing components such as graphical processing units, serial ports, parallel ports, universal serial bus, and other input/output peripherals. The input/output peripherals 708 are connected to the processor 702 through any of the ports coupled to the interface bus 712. The communication peripherals 710 are configured to facilitate communication between the computing system 700 and other computing devices over a communications network and include, for example, a network interface controller, modem, wireless and wired interface cards, antenna, and other communication peripherals.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention claimed is:

1. A method for intelligently distributing interactive content for accessing online platforms via electronic communication channels, the method comprising:
    receiving, by a computer system and from a marketer device, a request for an attribution, to a target user response, of a particular electronic communication channel from a set of electronic communication channels, wherein the target user response comprises a navigation of a user device to an online platform via interactive content distributed among a combination of the electronic communication channels in the set;
    accessing, by the computer system, exposure feature vectors comprising binary vector data structures having dimensions representing response data, the response data generated from responses of user devices that correspond to exposures of the user devices to prior interactive content distributed via the set of electronic communication channels;
    estimating, by the computer system and based on the response data, a likelihood of the target user response given the combination of the electronic communication channels, the combination comprising the particular electronic communication channel;
    generating, by the computer system, an output attribution of the particular electronic communication channel to the target user response based on the likelihood of the target user response, wherein generating the output attribution comprises:
        segmenting the response data into (i) a first group corresponding to a first set of exposure feature vectors representing a first combination of exposures of the user devices to the prior interactive content distributed via the set of electronic communication channels and (ii) a second group corresponding to a second set of exposure feature vectors representing a second combination of exposures of the user devices to the prior interactive content distributed via the set of electronic communication channels, wherein the first and second combinations of exposures are different from each other,
        generating a first coalition game model from the first group and a second coalition game model from the second group,
        computing a first attribution to the particular electronic communication channel by applying the first coalition game model to the set of electronic communication channels,
        computing a second attribution to the particular electronic communication channel by applying the second coalition game model to the set of electronic communication channels, and
        aggregating the first attribution and the second attribution into the output attribution; and
    causing the marketer device to modify a distribution, among the set of electronic communication channels, of interactive content for navigating to the online platform, wherein causing the marketer device to modify the distribution of interactive content comprises transmitting, from the computer system to the marketer device, attribution data including the output attribution.

2. The method of claim 1, further comprising:
    analyzing a plurality of attributions corresponding to the set of electronic communication channels;
    generating a recommendation for modifying usage of the particular electronic communication channel based on the plurality of attributions;
    providing the recommendation to the marketer device;
    receiving a resource reallocation for the particular electronic communication channel from the marketer device based on the recommendation; and
    providing, based on the resource reallocation, an interactive content item to a computing device of a user via the particular electronic communication channel.

3. The method of claim 1, wherein causing the marketer device to modify the distribution of interactive content comprises causing the marketer device to perform a resource allocation to the particular electronic communication channel.

4. The method of claim 1, further comprising analyzing a difference between the output attribution and an additional attribution of an additional electronic communication channel to improve usage of the particular electronic communication channel or the additional electronic communication channel.

5. The method of claim 1, wherein estimating the likelihood of the target user response comprises:
    generating each potential combination of electronic communication channels of the set of electronic communication channels;
    estimating a value function based on each potential combination of electronic communication channels, wherein each value of the value function corresponds to a potential combination of electronic communication channels and comprises a likelihood of a user exhibiting the target user response given an exposure of the user to the potential combination of electronic communication channel.

6. The method of claim 1, wherein the likelihood is estimated based on a number of users associated with user devices exhibiting the target user response and having been exposed to the combination of the electronic communication channels relative to a total number of the users having been exposed to the combination of the electronic communication channels.

7. The method of claim 1, wherein the likelihood is estimated by at least:

for each electronic communication channel of the combination of the electronic communication channels, estimating an individual likelihood based on a subset of the responses corresponding to exposures of users associated with user devices to the electronic communication channel; and estimating the likelihood associated with the combination of the electronic communication channels based on individual values estimated for the electronic communication channels of the combination of the electronic communication channels.

8. The method of claim 1, wherein the likelihood is estimated by averaging individual likelihoods corresponding to user exposures to individual electronic communication channels of the combination of the electronic communication channels.

9. The method of claim 1, wherein estimating the likelihood of the target user response comprises estimating a first value function based on potential combinations of electronic communication channels, wherein each value of the first value function corresponds to a likelihood of the target user response given an exposure to a potential combination of electronic communication channels, and further comprising:
estimating a second value function of the set of electronic communication channels based on the first value function, the second value function associated with no exposures of users associated with user devices to the set of electronic communication channels, and wherein the output attribution of the particular electronic communication channel is further estimated based on the second value function.

10. The method of claim 1, wherein the target user response further comprises one or more of a purchase, a click through, or a page view, and wherein the electronic communication channels comprise one or more of: a web page, an advertisement with interactive content displayed in the web page, an email with a clickable link, or a social network post.

11. A system comprising:
a processor;
a network interface device communicatively coupled to a marketer device;
a memory communicatively coupled to the processor and bearing computer-readable instructions that, upon execution by the processor, cause the system to perform operations:
receiving, from the marketer device, a request for an attribution, to a target user response, of a particular electronic communication channel from a set of electronic communication channels, wherein the target user response comprises a navigation of a user device to an online platform via interactive content distributed among a combination of the electronic communication channels;
accessing exposure feature vectors comprising binary vector data structures having dimensions representing response data, the response data generated from responses of user devices that correspond to exposures of the user devices to prior interactive content distributed via the set of electronic communication channels;
estimating, based on the response data, a likelihood of the target user response given the combination of the electronic communication channels, the combination comprising the particular electronic communication channel;

generating an output attribution of the particular electronic communication channel to the target user response based on the likelihood of the target user response, wherein generating the output attribution comprises:
segmenting the response data into (i) a first group corresponding to a first set of exposure feature vectors representing a first combination of exposures of the user devices to the prior interactive content distributed via the set of electronic communication channels and (ii) a second group corresponding to a second set of exposure feature vectors representing a second combination of exposures of the user devices to the prior interactive content distributed via the set of electronic communication channels, wherein the first and second combinations of exposures are different from each other,
generating a first coalition game model from the first group and a second coalition game model from the second group,
computing a first attribution to the particular electronic communication channel by applying the first coalition game model to the set of electronic communication channels,
computing a second attribution to the particular electronic communication channel by applying the second coalition game model to the set of electronic communication channels, and
aggregating the first attribution and the second attribution into the output attribution; and
causing the marketer device to modify a distribution, among the set of electronic communication channels, of interactive content for navigating to the online platform, wherein causing the marketer device to modify the distribution of interactive content comprises transmitting, from the processor to the marketer device, attribution data including the output attribution.

12. The system of claim 11, wherein the target user response further comprises one or more of a purchase, a click through, or a page view, and wherein the electronic communication channels comprise one or more of: a web page, an advertisement with interactive content displayed in the web page, an email with a clickable link, or a social network post.

13. The system of claim 11, wherein the target user response further comprises a conversion resulting from the navigation to the online platform, wherein the operations further comprise:
generating the combination of the electronic communication channels from the set of electronic communication channels;
accessing a set of the responses corresponding to exposures of users to the combination of the electronic communication channels; and
estimating a likelihood of conversion from the exposures of the users to the combination of the electronic communication channels based on the set of the responses.

14. The system of claim 11, wherein the operations further comprise:
for each user having the target user response:
determining a particular combination of electronic communication channels that resulted in the target user response of the user and that comprise an electronic communication channel; and estimating a surplus of the particular electronic communication channel based on a corresponding value of the particular combination of electronic communication channels; and estimating the output attribution of the particular electronic communication channel based on surpluses estimated for the particular electronic communication channel for a subset of the users having the target user response and exposed to the particular electronic communication channel.

15. The system of claim 11, wherein the operations further comprise estimating a likelihood of conversion based on exposures of users to the combination of the electronic communication channels, wherein estimating the likelihood of conversion comprises:

determining whether a set of the responses is sufficient to estimate the likelihood of conversion;

if the set of the responses is sufficient, utilizing the set of the responses to estimate the likelihood of conversion; and if the set of the responses is insufficient,
accessing subsets of the responses corresponding to exposures of the users to respective electronic communication channels of the combination of the electronic communication channels;
estimating individual likelihoods of conversion corresponding to the respective electronic communication channels based on the subset of the responses; and
utilizing the individual likelihoods of conversion to estimate the likelihood of conversion.

16. The system of claim 11, wherein the operations further comprise collecting the responses by storing the responses in a data store accessible to the system, wherein each response is stored in association with a corresponding combination of electronic communication channels to which a user associated with the user device was exposed.

17. A non-transitory computer-readable storage medium storing instructions that, when executed on a computing system, configure the computing system to perform operations comprising at least:

receiving, from a marketer device, a request for an attribution, to a target user response, of a particular electronic communication channel from a set of electronic communication channels, wherein the target user response comprises a navigation of a user device to an online platform via interactive content distributed among a combination of the electronic communication channels;

accessing exposure feature vectors comprising binary vector data structures having dimensions representing response data, the response data generated from responses of user devices that correspond to exposures of the user devices to prior interactive content distributed via the set of electronic communication channels;

estimating, based on the response data, a likelihood of the target user response given the combination of the electronic communication channels, the combination comprising the particular electronic communication channel;

generating, by the computer system, an output attribution of the particular electronic communication channel to the target user response based on the likelihood of the target user response, wherein generating the output attribution comprises:

segmenting the response data into (i) a first group corresponding to a first set of exposure feature vectors representing a first combination of exposures of the user devices to the prior interactive content distributed via the set of electronic communication channels and (ii) a second group corresponding to a second set of exposure feature vectors representing a second combination of exposures of the user devices to the prior interactive content distributed via the set of electronic communication channels, wherein the first and second combinations of exposures are different from each other, generating a first coalition game model from the first group and a second coalition game model from the second group, computing a first attribution to the particular electronic communication channel by applying the first coalition game model to the set of electronic communication channels, computing a second attribution to the particular electronic communication channel by applying the second coalition game model to the set of electronic communication channels, and aggregating the first attribution and the second attribution into the output attribution; and causing the marketer device to modify a distribution, among the set of electronic communication channels, of interactive content for navigating to the online platform, wherein causing the marketer device to modify the distribution of interactive content comprises transmitting, to the marketer device, attribution data including the output attribution.

18. The computer-readable storage medium of claim 17, wherein the output attribution of the particular electronic communication channel is further estimated based on a set of user devices having the target user response.

19. The computer-readable storage medium of claim 17, wherein the instructions, when executed on the computing system, further configure the computing system to perform operations comprising at least:

for each user having the target user response:
determining a particular combination of electronic communication channels that resulted in the target user response of the user and that comprise an electronic communication channel; and estimating a surplus of the particular electronic communication channel based on a corresponding value of the particular combination of electronic communication channels; and estimating the output attribution of the particular electronic communication channel based on surpluses estimated for the particular electronic communication channel for a subset of the users having the target user response and exposed to the particular electronic communication channel.

20. The computer-readable storage medium of claim 17, wherein the electronic communication channels represent players of one or more of the first coalition game model and the second coalition game model, wherein the one or more of the first coalition game model and the second coalition game model includes a characteristic function for attribution computation.

* * * * *